United States Patent [19]

Meyer

[11] 4,449,179

[45] May 15, 1984

[54] MEANS FOR CAPACITIVE MEASUREMENT OF DISPLACEMENTS

[76] Inventor: Hans U. Meyer, Rue des Taneurs 3, 1110 Morges, Switzerland

[21] Appl. No.: 267,040

[22] Filed: May 26, 1981

[30] Foreign Application Priority Data

May 27, 1980 [DE] Fed. Rep. of Germany ....... 3020411

[51] Int. Cl.³ .............................................. G01R 27/26
[52] U.S. Cl. ................................................. 324/61 R
[58] Field of Search ........................... 324/61 P, 61 R

[56] References Cited

U.S. PATENT DOCUMENTS

| 3,039,051 | 6/1962 | Locher | 324/61 R |
|---|---|---|---|
| 3,312,892 | 4/1967 | Parnes | 324/61 R UX |
| 3,815,021 | 6/1974 | Kerr | 324/61 R |
| 3,824,460 | 7/1974 | Gustafson | 324/61 R |
| 3,845,377 | 10/1974 | Shimotori | 324/61 R X |
| 3,857,092 | 12/1974 | Meyer | 324/61 R |
| 3,883,800 | 5/1975 | Dupont | 324/61 R |

FOREIGN PATENT DOCUMENTS 2457003  1/1981  France .............................. 324/61 R Primary Examiner—Stanley T. Krawczewicz
Attorney, Agent, or Firm—Emory L. Groff, Jr.

[57] ABSTRACT

The means for the capacitive measurement of displacements includes a scale in the form of a belt (10) movable longitudinally in relation to a measuring device which is provided with several groups of electrodes (22 to 25) connected by lines (27) to an electronic means. The belt (10) is made of metal and is provided with a plurality of regularly spaced rectangular openings (11). The belt (10) constitutes, with the transmitting electrodes (22 to 25) and a receiving electrode (29) situated relative to the transmitting electrodes, a differential condenser permitting the accomplishment of capacitive measurement of displacements.

5 Claims, 6 Drawing Figures

MEANS FOR CAPACITIVE MEASUREMENT OF DISPLACEMENTS

This invention relates to means for capacitive measurement of displacements, including a scale in the form of a belt and a measuring device, the measuring device being provided with a series of transmitting electrodes and at least one receiving electrode.

Known devices of this type include a measuring device carrying a series of electrodes and a gauge including one or more electrodes whose position can be determined by a differential capacitor transducer. A large measuring plate is divided into smaller ones so that transmitting errors, due to a lack of accuracy in the transmitting functions, do not harm the accuracy of the gauge.

Thus, an inaccuracy resulting in an error of one for a thousand corresponds to an error of one millimeter for a measuring plate of one meter. On the other hand, if a scale is built to permit a measuring plate of one millimeter, the error due to the transmission is only achieved by a micrometer. In order to compensate for these errors of division, it is advantageous to effect simultaneously measurement by several divisions. In such a case, the simple or differential capacity is constituted by several successive elementary capacities.

The object of the present invention is to provide means of the type mentioned above in which the regulation of measurement can be achieved as simply as possible.

To this effect, the means is characterized by the fact that the scale comprises an electrically conductive belt, having regularly spaced openings, said belt traversing the measuring plate in such a way that the openings provide a differential condenser with said electrodes formed by several elementary condensers, said condenser being variable in the function of the position of said belt by its relationship to the measuring plate.

Because of these characteristics, such a scale can be constructed very simply while providing some excellent qualities concerning the accuracy of the measurement. Another advantage resides in the fact that the belt can be lengthened while remaining within its limit of elasticity which makes adjustment of the measurement possible. Finally, the belt can be put to mass potential and thus does not require any electrical connection.

The attached drawing shows schematically and by way of example a preferred form of execution of the invention.

Figure 5:
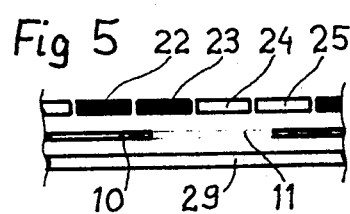

FIG. 5 schematically illustrates the disposition of the electrodes; and

Figure 6:
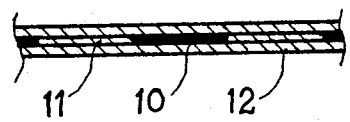

FIG. 6 is a cross-section of a measuring device having some parts provided with a dielectric.

Figure 1:
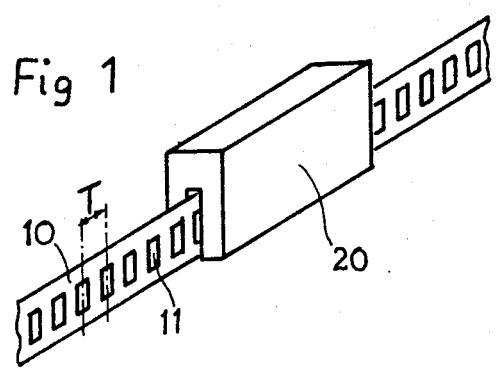
FIG. 1 is a perspective view of the scale and the measuring device.
Figure 2:
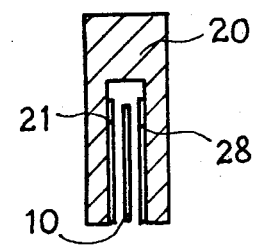
FIG. 2 is a cross-section of the measuring device and the scale, taken transversely in the direction of the scale.

As shown in FIGS. 1 and 2, the means includes a scale comprising a metallic belt 10 and a measuring device 20. The belt 10 is provided with regularly spaced rectangular openings 11 with the distance between the center axis of adjacent openings being designated by T. The measuring device 20 includes a plurality of surfaces 21 carrying a plurality of transmitting electrodes 22, 23, 24, 25 and a surface 28 carrying a receiving electrode 29.

Figure 3:
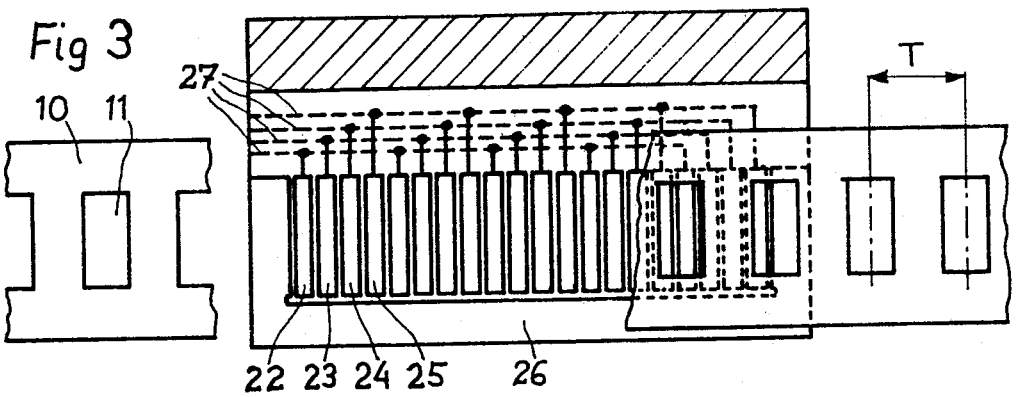
FIG. 3 is a longitudinal section of the measuring device showing the transmitting electrodes.

The belt 10 is arranged between these surfaces 21 and 28. The surface of the transmitting electrode, which is shown in FIG. 3, includes a whole multiple of 2N electrodes. In the case shown 2N=4.

The distance T between electrodes 22, 23, 24 and 25 T/2N is therefore in the present case T/4, so that for the value T of the distance between center axis of the openings 11 of belt 10 one counts 2N, that is to say 4 electrodes. The electrodes are connected by lines 27 to an electronic means as N electrodes, in the present case, two electrodes constitute, from an electrical point of view, a plate of a differential condenser. The following N electrodes constitute the second electrode of this differential condenser. The common plate of the differential condenser is formed by the part of the receiving electrode 29 which is located with respect to the corresponding opening 11 of the belt 10, as shown in FIG. 5.

Thus, the electrodes of the measuring device 20 comprise with the openings 11 of the belt 10, a series of differential condensers of the same type, which are interconnected in order to form a single differential condenser. On can see that the variation of the differential capacity is proportionate to the displacement of the belt. If the displacement of the belt surpasses a determined value, electric means shifts the distribution of the transmitting electrodes from the value of one electrode.

The measurement can be effected by means of different known electrical circuits, for example, by one described in the German Pat. No. 2,218,824.

The measurement of the differential capacity, therefore, gives an accurate measure and as soon as this measurement surpasses a determined value, the graduation is displaced in the direction of the removal of the belt in such a way that the plates, which are formed of N electrodes, following the displacement of the openings 11 of the belt 10 by steps yielding T/2N from an electrical point of view, that is to say in the present case, by steps yielding T4, which gives the approximate measurement.

The exact measurement is the sum of the precision measurement and the approximate measurement. Up to now there has not been taken into account any two openings 11 of belt 10 which go beyond the the edges of the transmitted exteriors of the row of openings and which are, therefore only partially covered by the transmitting electrodes. By referring to FIGS. 3 and 4, it is clear that the sum of the partial capacities with respect to these two openings correspond exactly to the partial capacity of a single opening situated at the interior of the series of transmitting electrodes. In other words, the error which is produced by one end of the electrode series is compensated for by the error which is produced by the other end and this must be taken into account in any one of the following conditions:

(1) The receiving electrode 29 must be shorter than the series of transmitting electrodes and present a length which is an entire multiple of the distance T between the center axis of the openings.

Figure 4:
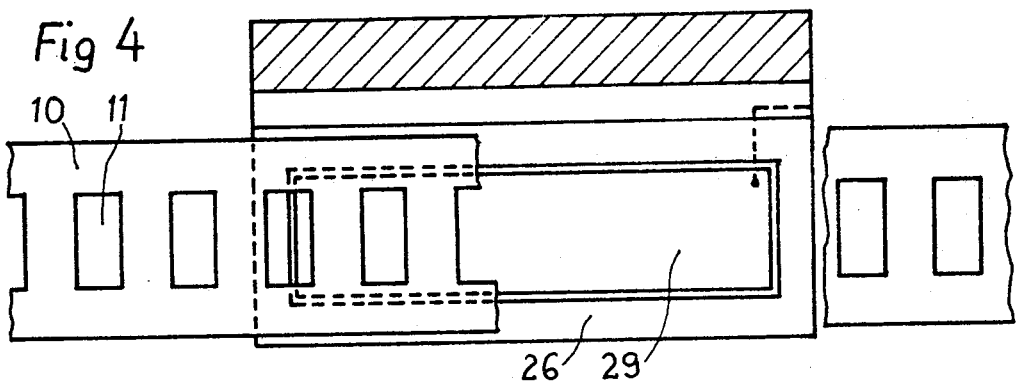
FIG. 4 is a cross-section showing the receiving electrode.

(2) The receiving electrode must also be as long as or even longer than the series of transmitting electrodes. In this case, the length of the row of transmitting electrodes must be equal to an entire multiple of the distance T. In these two cases, it is desirable, in order to avoid the effects of the edge as well as external parasites, to surround the receiving electrodes 29 by means of a surface 26 placed in the body of the measuring device as shown in FIGS. 3 and 4.

In order to keep impurities from settling on the opening 11 of belt 10 and to protect the belt, from a mechanical and chemical point of view, it is possible to cover it with a protective layer 12 providing good dielectric characteristics. This layer can be, for example, made of Teflon as shown in FIG. 6. This protective layer in no way affects the function of the device.

I claim:

1. Means for capacitive measurement of displacements comprising, a scale and a measuring device (20) said measuring device provided with a series of transmitting electrodes (22 to 25) and at least one receiving electrode (29), characterized by the fact that said scale comprises an electrically conductive belt (10) having a plurality of regularly spaced openings (11), the distance (T) between the center axis of adjacent openings covering at least three transmitting electrodes said belt (10) passing through the measuring device (20) in such a way that the openings (11) comprise, together with said electrodes (22 to 25 and 29), a differential condenser formed by a plurality of elementary condensers, the capacity of which varies in function of the position of said belt (10) with respect to the measruing device (20).

2. Means according to claim 1 wherein, the openings (11) in said belt (10) and the electrodes (22 to 25 and 29) are of rectangular form to obtain a linear correspondence between the displacement and variation of the differential capacity.

3. Means according to claim 1 wherein, the openings (11) of the belt (10) are provided with a dielectric coating (12).

4. Means according to claim 1 or 2 wherein, the length of the receiving electrode (29) in the direction of displacement is an integer multiple of the distance (T) of the openings (11).

5. Means according to claim 1 or 4 wherein, said belt (10) is made of insulating material coated with a conducting layer.

* * * * *